(12) United States Patent
Ishikawa (10) Patent No.: US 7,993,795 B2
(45) Date of Patent: Aug. 9, 2011

(54) ELECTRONIC DEVICE

(75) Inventor: Tetsushi Ishikawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 909 days.

(21) Appl. No.: 12/001,445

(22) Filed: Dec. 11, 2007

(65) Prior Publication Data

US 2008/0145735 A1 Jun. 19, 2008

(30) Foreign Application Priority Data

Dec. 13, 2006 (JP) ................................ 2006-335433

(51) Int. Cl.
*H01M 8/10* (2006.01)
*H01M 2/02* (2006.01)
(52) U.S. Cl. ........ 429/507; 429/512; 396/539; 396/540; 348/372
(58) Field of Classification Search .................. 429/507, 429/512; 396/539, 540; 348/372
See application file for complete search history.

(56) References Cited

U.S. PATENT DOCUMENTS

| 2005/0227136 A1* | 10/2005 | Kikuchi et al. | 429/34 |
| 2006/0127733 A1* | 6/2006 | Kaschmitter et al. | 429/34 |
| 2008/0026278 A1* | 1/2008 | Iyoda et al. | 429/34 |

FOREIGN PATENT DOCUMENTS

| JP | 9-213359 A | 8/1997 |
| JP | 2005-116502 A | 4/2005 |
| JP | 2005-300710 A | 10/2005 |
| JP | 2005-321490 A | 11/2005 |

OTHER PUBLICATIONS

Japanese Office Action dated Dec. 2, 2008, and English translation thereof issued in counterpart Japanese Application No. 2006-335433.

* cited by examiner

*Primary Examiner* — Ula C Ruddock
*Assistant Examiner* — Amanda Barrow
(74) *Attorney, Agent, or Firm* — Holtz, Holtz, Goodman & Chick, PC (57) ABSTRACT

An electronic device including a fuel container to accumulate fuel inside thereof, a fuel cell device body unit engaged with the fuel container and comprising a power generating cell to generate electricity by using the fuel which is supplied from the fuel container and an electronic device body unit in which the electricity is supplied from the fuel cell device body unit, and the electronic device body unit comprises a case having a concave portion in which the fuel cell device body unit and the fuel container are housed, an opening part which forms an open end of the concave portion, and the fuel cell device body unit and the fuel container are engageable with and separable from each other and detachable from the concave portion in a state where the fuel cell device body unit and the fuel container are engaged to one another and only the fuel container is detachable from the concave portion.

9 Claims, 13 Drawing Sheets

ELECTRONIC DEVICE

CROSS-REFERENCE TO RELATED APPLICATIONS

This application is based upon and claims the benefit of priority from the prior Japanese Patent Application No. 2006-335433, filed Dec. 13, 2006, the entire contents of which are incorporated herein by reference.

BACKGROUND OF THE INVENTION

1. Field of the Invention

The present invention relates to an electronic device, and particularly to an electronic device loading a fuel cell.

2. Description of Related Art

In recent years, portable electronic devices such as a cell phone, a digital camera, a notebook-type personal computer, a PDA (Personal Digital Assistance), an electronic organizer, a watch, a portable-type music player and the like are achieving remarkable progress and development.

In order to accommodate the increase of the electric power consumption in such electronic devices, it is suggested to use a fuel cell for the power source unit. Therefore, downsizing, cost reduction and the like of the fuel cell are broadly studied and developed.

The fuel cell has a power generating cell to take out electricity due to the electrochemical reaction of hydrogen in the fuel and oxygen in the air, and simple hydrogen is suggested as a fuel used for the fuel cell. However, handling and storage of simple hydrogen is difficult because it is gas at normal temperature. A reform-type fuel cell which is provided with a chemical reaction unit having a reformer or the like to generate gas including hydrogen by reforming the fuel due to the reforming reaction and which generates the hydrogen gas by reforming the liquid fuel such as alcohol or gasoline and provide the generated hydrogen gas to the power generating cell, and a direct methanol type fuel cell which supplies the liquid fuel and air directly to the power generating cell are being studied and developed. Further, the electronic device loading such fuel cells are being developed.

The power source unit of the electronic device loading the fuel cell which uses the above described fuel cell comprises a fuel container filled with liquid fuel and a fuel cell body unit including the power generating cell, the chemical reaction unit and the like, and is structured so that the liquid fuel is supplied to the fuel cell body unit from the fuel container and that power is generated in the fuel cell body unit. Further, conventionally, the fuel cell body unit is structured so as to be fixedly provided in the electronic device, and only the fuel container is structured so as to be exchangeable in many cases. In such case, the electronic device can be continuously used by exchanging the fuel container when the liquid fuel which is filled in the fuel container is used up due to the power generating operation of the fuel cell. However, at the time of maintenance or breakdown of the power generating cell or the chemical reaction unit which are provided at the fuel cell body unit, the case of the electronic device is opened, for example, and an operation needs to be carried out for the fuel cell body unit. This operation was causing a great trouble.

SUMMARY OF THE INVENTION

In the present invention, the power source unit comprises a fuel container and a fuel cell body unit in the electronic device having the power source unit using the fuel cell. Further, only the fuel container is detachable from the electronic device, and there is an advantage that the fuel cell body unit can also be detachable from the electronic device.

To obtain the above advantages, the first electronic device according to the present invention comprises a fuel container to accumulate fuel inside thereof, a fuel cell device body unit engaged with the fuel container and comprising a power generating cell to generate electricity by using the fuel which is supplied from the fuel container and an electronic device body unit in which the electricity is supplied from the fuel cell device body unit, and the electronic device body unit comprises a case having a concave portion in which the fuel cell device body unit and the fuel container are housed, an opening part which forms an open end of the concave portion, and the fuel cell device body unit and the fuel container are engageable with each other and separable from each other and detachable from the concave portion in a state where the fuel cell device body unit and the fuel container are engaged to one another and only the fuel container is detachable from the concave portion in a state where the fuel container is separated from the fuel cell device body unit.

To obtain the above advantages, the second electronic device according to the present invention comprises a fuel container to accumulate fuel inside thereof, a fuel cell device body unit engaged with the fuel container and comprising a power generating cell to generate electricity by using the fuel which is supplied from the fuel container and an electronic device body unit in which the electricity is supplied from the fuel cell device body unit, and the electronic device body unit comprises a case having a concave portion in which the fuel cell device body unit and the fuel container are housed, an opening part which forms an open end of the concave portion and a lid which covers the opening part, the fuel cell device body unit comprises an inlet to at least take in air needed for a power generating operation in the power generating cell and an outlet to at least exhaust a gas which is exhausted from the power generating cell as waste gas on a surface which faces the lid in a state where the fuel cell device body unit is housed in the concave portion, and a plurality of through holes where the air or the waste gas pass through are provided on the lid and at least one through hole of the plurality of through holes is provided at a position facing either one of the inlet and the outlet.

DETAILED DESCRIPTION OF THE PREFERRED EMBODIMENTS

Hereinafter, the electronic device according to the present invention is described in detail based on the embodiments which are shown in the drawings.

A variety of technically preferable limitations are imposed on embodiments to be described below in order to carry out the present invention. However, the scope of the present invention is not limited to the following embodiments and the illustrated examples.

First Embodiment

Figure 1:
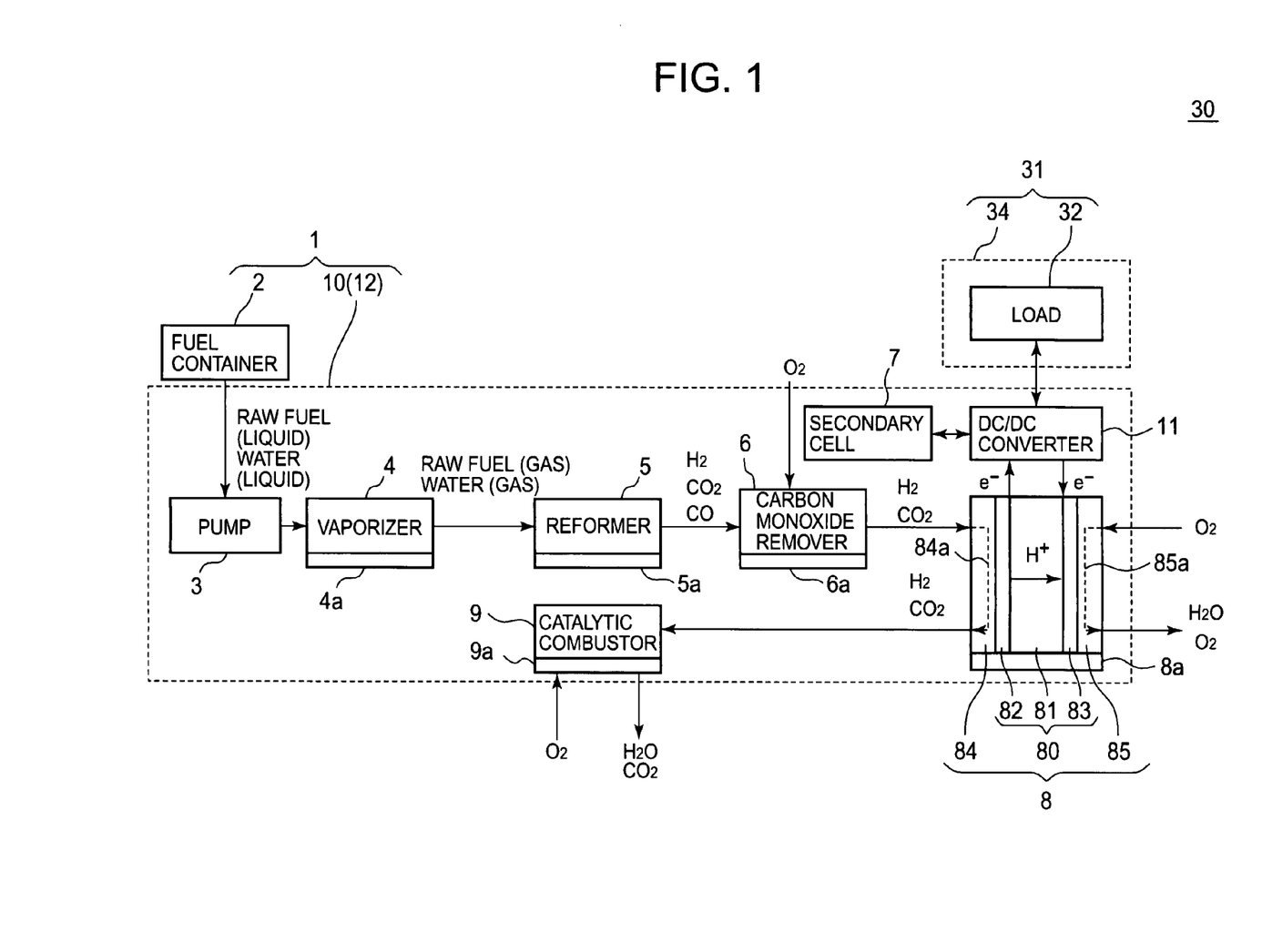
FIG. 1 is a block diagram showing a structure of an entire electronic device according to the first embodiment of the present invention.

FIG. 1 is a block diagram showing a structure of an entire electronic device 30 according to the first embodiment of the present invention.

The electronic device 30 is a portable electronic device such as a notebook-type personal computer, a PDF, an electronic organizer, a digital camera, a cell phone, a watch, a portable-type music player, a register, a projector or the like. In the following embodiment, a case in which the present invention is applied to a digital camera will be described as an example.

The electronic device 30 comprises a fuel cell device 1 and an electronic device body unit 31.

The electronic device body unit 31 comprises a load 32 and a case 34 to house the load 32.

The load 32 consumes electronic energy. For example, the load 32 is a motor to drive the lens, an imaging device for an imaging element and the like, other electronic devices, a control unit to control the above and the like.

The fuel cell device 1 generates electronic energy and outputs the generated electronic energy to the electronic device body unit 31. The fuel cell device 1 comprises a fuel container 2 and a fuel cell device body unit 10.

The fuel container 2 is detachably provided at the case 12 of the fuel cell device body unit 10. Liquid raw fuel is accumulated in the fuel container 2. Preferably, for example, the raw fuel is a liquid mixture including a compound which includes hydrogen in the composition such as methanol, ethanol, dimethylethanol or the like and water. Here, the raw fuel and water may be accumulated in separate containers when water is not included in the raw fuel.

The fuel cell device body unit 10 comprises a pump 3, a vaporizer 4, a reformer 5, a carbon monoxide remover 6, a power generating cell 8, a catalytic combustor 9, a DC/DC converter 11, a secondary cell 7, and the case 12 to house all the above.

The secondary cell 7 stores the electronic energy generated by the power generating cell 8 via the DC/DC converter 11, and provides the electronic energy stored in the secondary cell 7 to the electronic device body unit 31 and provides the electricity needed for starting up the fuel cell device body unit 10 when the power generating cell 8 is not operating.

The pump 3 aspirates the raw fuel in the fuel container 2 and sends the raw fuel to the vaporizer 4.

The vaporizer 4 is provided with an electric heater/temperature sensor 4a constituted of an electric heating material in which the electrical resistivity depends on the temperature of the electric heating material itself. The electric heater/temperature sensor 4a is a device in which the electrical resistivity depends on the temperature of the electric heater/temperature sensor 4a itself, and also functions as a temperature sensor for the heater. The raw fuel which is sent to the vaporizer 4 from the pump 3 is vaporized by the heat of the electric heater/temperature sensor 4a or the heat of the catalytic combustor 9. The gas mixture vaporized in the vaporizer 4 is sent to the reformer 5.

The reformer 5 is provided with an electric heater/temperature sensor 5a constituted of an electric heating material in which the electrical resistivity depends on the temperature of the electric heating material itself. A flow passage is formed inside the reformer 5, and a catalyst is supported on the wall surface of the flow passage. The vaporized fluid which is sent to the reformer 5 from the vaporizer 4 flows through the flow passage of the reformer 5, is heated by the electric heater/temperature sensor 5a and the catalytic combustor 9, and carries out a reaction by the catalysis. Due to the catalytic reaction of the raw fuel, hydrogen as a fuel and carbon dioxide which is a byproduct (and the after mentioned small amount of carbon monoxide which is a byproduct) are generated.

Here, when the raw fuel includes methanol, a reaction shown in formula (1) mainly occurs in the reformer 5.

$$CH_3OH + H_2O \rightarrow 3H_2 + CO_2 \quad (1)$$

Carbon monoxide is generated in a small amount as a byproduct by a reaction shown in formula (2) which occurs sequentially after the reaction of formula (1).

$$H_2 + CO_2 \rightarrow H_2O + CO \quad (2)$$

The carbon monoxide remover 6 is provided with an electric heater/temperature sensor 6a constituted of an electric heating material in which the electrical resistivity depends on the temperature of the electric heating material itself. A flow passage is formed in the carbon monoxide remover 6, and a catalyst is supported on the wall surface of the flow passage. The reformed gas (fuel) which is generated in the reformer 5 is sent to the carbon monoxide remover 6. Further, outside air or oxygen is sent to the carbon monoxide remover 6. The reformed gas which is sent to the carbon monoxide remover 6 from the reformer 5 is mixed with the air or the oxygen, flows through the flow passage of the carbon monoxide remover 6, and is heated by the electric heater/temperature sensor 6a and the catalytic combustor 9. Then, the carbon monoxide among the reformed gas is preferentially oxidized by the selective oxidization reaction shown in formula (3) under the existence of the catalyst of the carbon monoxide remover 6. Thereby, carbon dioxide is generated, and carbon monoxide is removed from the reformed gas. For example, the concentration of the carbon monoxide in the reformed gas becomes less or equal to 10 ppm.

$$2CO + O_2 \rightarrow 2CO_2 \quad (3)$$

The power generating cell 8 comprises a film electrode assembly 80 which is constituted by connecting a fuel electrode 82 and an oxygen electrode 83 with both sides of the electrolyte film 81, a fuel electrode separator 84 which connects with the fuel electrode 82 to form the flow passage 84a on the connecting surface thereof, and an oxygen electrode separator 85 which connects with the oxygen electrode 83 to form the flow passage 85a on the connecting surface thereof.

The reformed gas (anode gas) which is exhausted from the carbon monoxide remover 6 is sent to the flow passage 84a in the fuel electrode separator 84 of the power generating cell 8. Air is sent to the flow passage 85a in the oxygen electrode separator 85 which is the other flow passage.

The fuel electrode 82 and the oxygen electrode 83 are connected with the DC/DC converter 11 which is in the electronic device 30. Then, electricity is generated between the fuel electrode 82 and the oxygen electrode 83 due to the hydrogen in the reformed gas which is provided to the fuel electrode 82 causing an electrochemical reaction shown below with the oxygen in the air (cathode gas) which is provided to the oxygen electrode 83.

When the electrolyte film 81 is a hydrogen ion permeable electrolyte film (for example, a solid polymer electrolyte film), a reaction shown in formula (4) occurs in the fuel electrode 82.

$$H_2 \rightarrow 2H^+ + 2e^- \quad (4)$$

The generated hydrogen ion passes through the electrolyte film 81 and is provided to the oxygen electrode 83. The generated electron is provided to the outer circuit (DC/DC converter 11).

At the oxygen electrode 83, the hydrogen ion which passed through the electrolyte film 81, air and the electron which is provided from the outer circuit (DC/DC converter 11) cause an electrochemical reaction shown in formula (5).

$$2H^+ + \tfrac{1}{2}O_2 + 2e^- \rightarrow H_2O \quad (5)$$

Water and the hydrogen ion which remain unreacted in the power generating cell 8 among the hydrogen ion generated in the reformer 5 are included in the reformed gas (off gas) which passed through the flow passage in the fuel electrode separator 84. The off gas is provided to the catalytic combustor 9.

Moreover, the power generating cell 8 is provided with an electric heater/temperature sensor 8a which is constituted of an electric heating material in which the electrical resistivity depends on the temperature of the electric heating material itself.

The catalytic combustor 9 is provided with outside air along with the off gas. A flow passage is formed inside the catalytic combustor 9, and a catalyst is supported on the wall surface of the flow passage.

The gas mixture (burning gas) of the off gas and air (oxygen) flows through the flow passage of the catalytic combustor 9, the hydrogen gas among the burning gas is combusted by the oxygen under the existence of the catalyst of the catalytic combustor 9, and thereby the combustion heat is generated. The waste gas after being combusted is released outside of the case 12 from the catalytic combustor 9.

The combustion heat generated in the catalytic combustor 9 is used for the vaporization in the vaporizer 4, the reforming reaction in the reformer 5 and the selective oxidization reaction in the carbon monoxide remover 6.

The catalytic combustor 9 is provided with an electric heater/temperature sensor 9a. The electric heater/temperature sensor 9a also functions as a temperature sensor to measure the temperature of the catalytic combustor 9 because the electric resistivity of the electric heater/temperature sensor 9a depends on the temperature thereof.

Here, the electrical resistivity of each of the electric heater/temperature sensor 4a, 5a, 6a, 8a and 9a depends on the temperature of each of the electric heater/temperature sensor 4a, 5a, 6a, 8a and 9a, respectively. Therefore, the electric heater/temperature sensors 4a, 5a, 6a, 8a and 9a function as the temperature sensors to measure the temperature of the vaporizer 4, the reformer 5, the carbon monoxide remover 6, the power generating cell 8 and the catalytic combustor 9, respectively. Thus, the vaporizer 4, the reformer 5, the carbon monoxide remover 6, the power generating cell 8 and the catalytic combustor 9 can be maintained at normal temperature by independently controlling the operation of each of the electric heater/temperature sensor 4a, 5a, 6a, 8a and 9a even when the optimal temperature for each of the above are different.

The DC/DC converter 11 converts the electric energy generated by the power generating cell 8 into appropriate voltages and outputs to the electronic device body unit 10.

[Structure of the Electronic Device]

Next, the specific structure of the electronic device 30 will be described in detail using examples.

Figure 2:
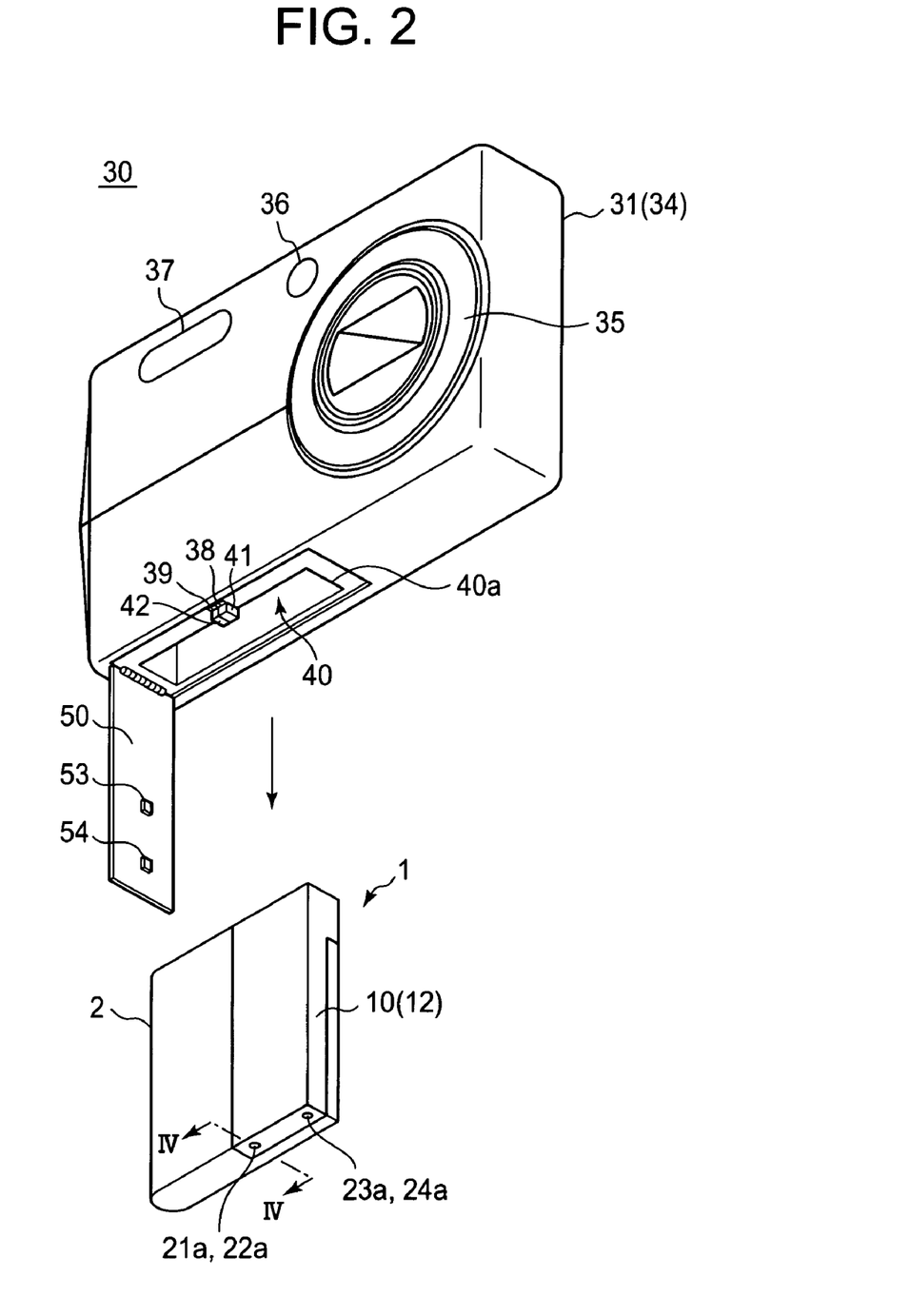
FIG. 2 is a perspective view showing a state where a fuel container and a fuel cell device body unit are removed from an electronic device body unit in the first embodiment.

FIG. 2 is a perspective view showing a state in which the fuel container 2 and the fuel cell device body unit 10 are removed from the electric device body unit 31 according to the embodiment.

Figure 3:
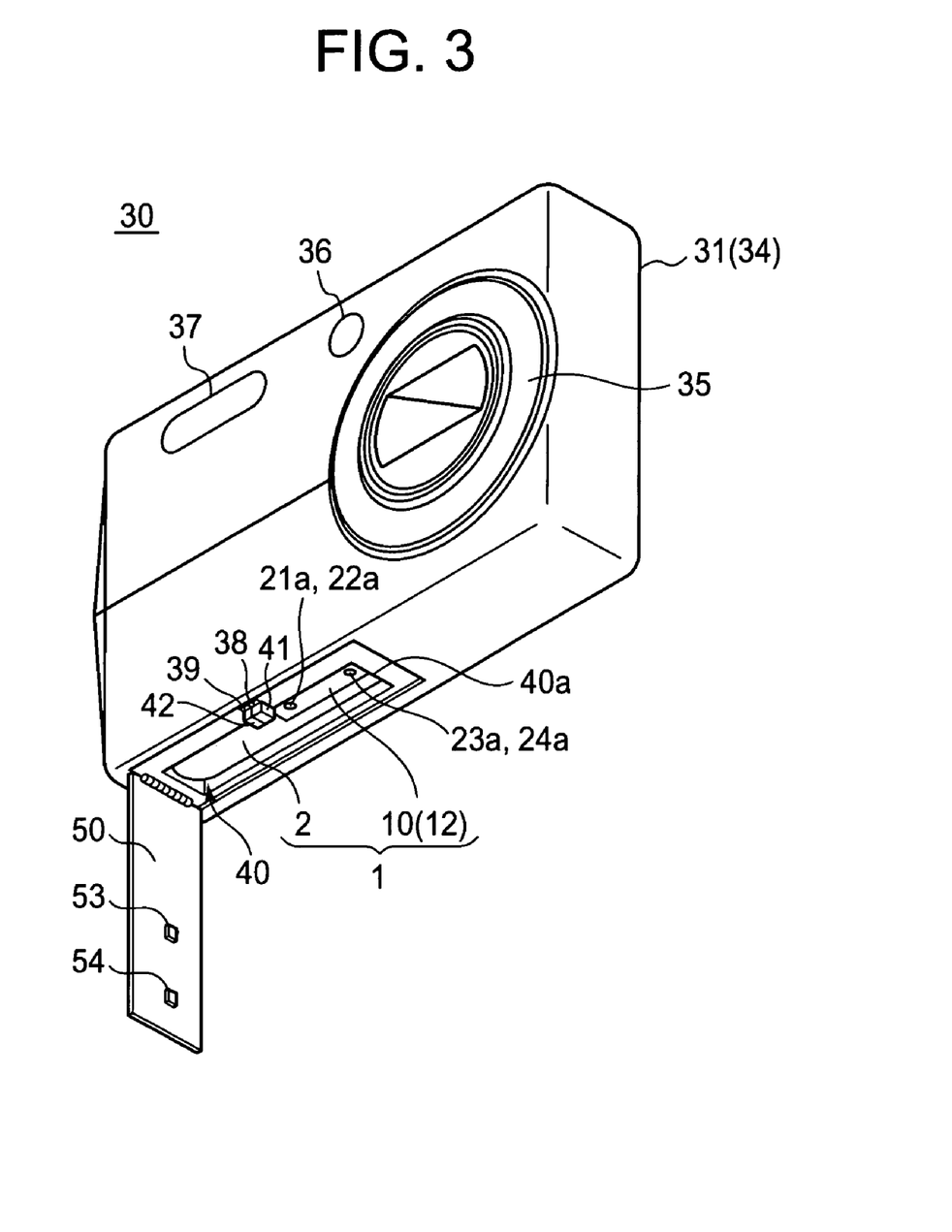
FIG. 3 is a perspective view showing a state where the fuel container and the fuel cell device body unit are housed in the electronic device body unit.

FIG. 3 is a perspective view showing a state in which the fuel container 2 and the fuel cell device body unit 10 are housed in the electronic device body unit 31 according to the embodiment.

Figure 4:
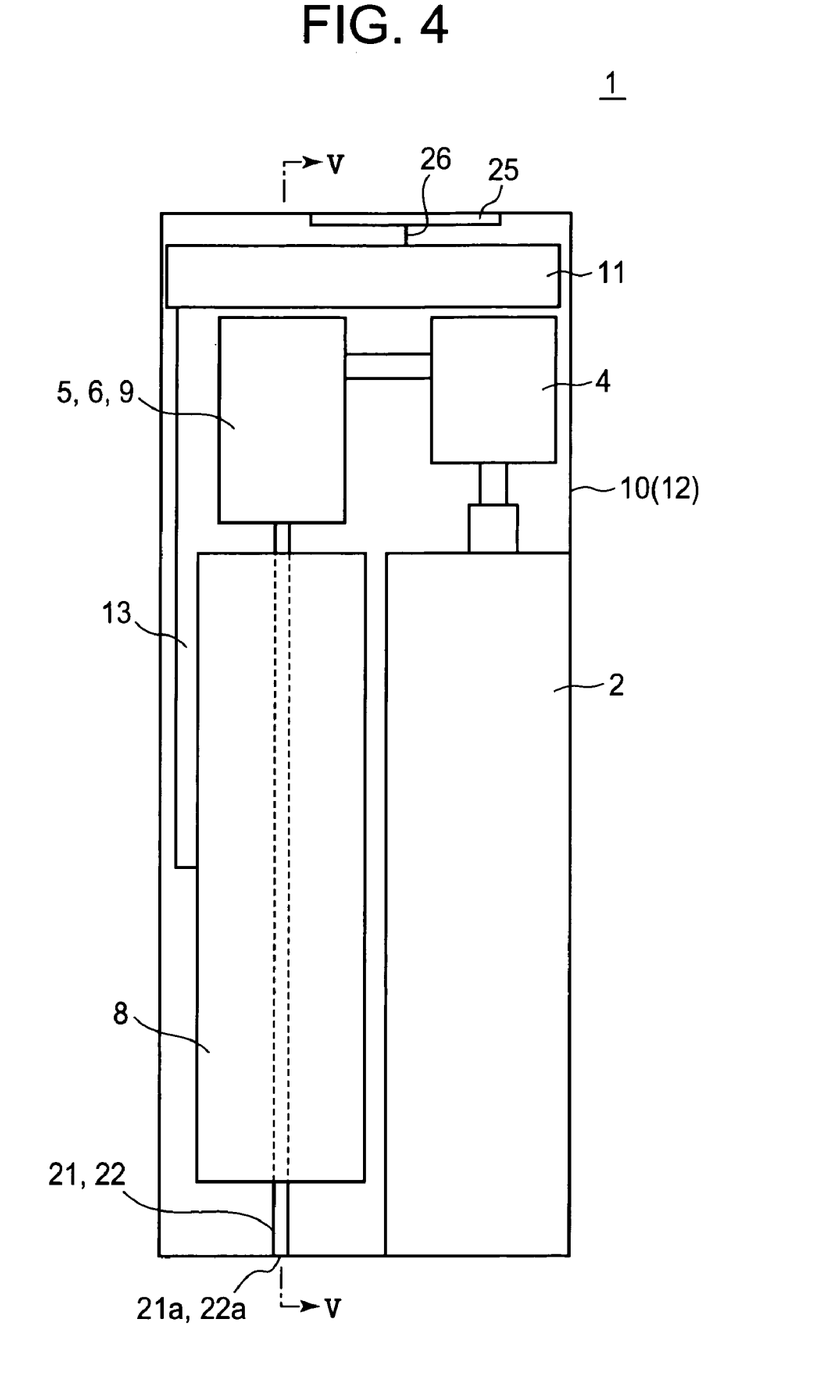
FIG. 4 is a sectional view cut along the line IV-IV of FIG. 2.

FIG. 4 is a sectional view cut along the line IV-IV of FIG. 2.

Figure 5:
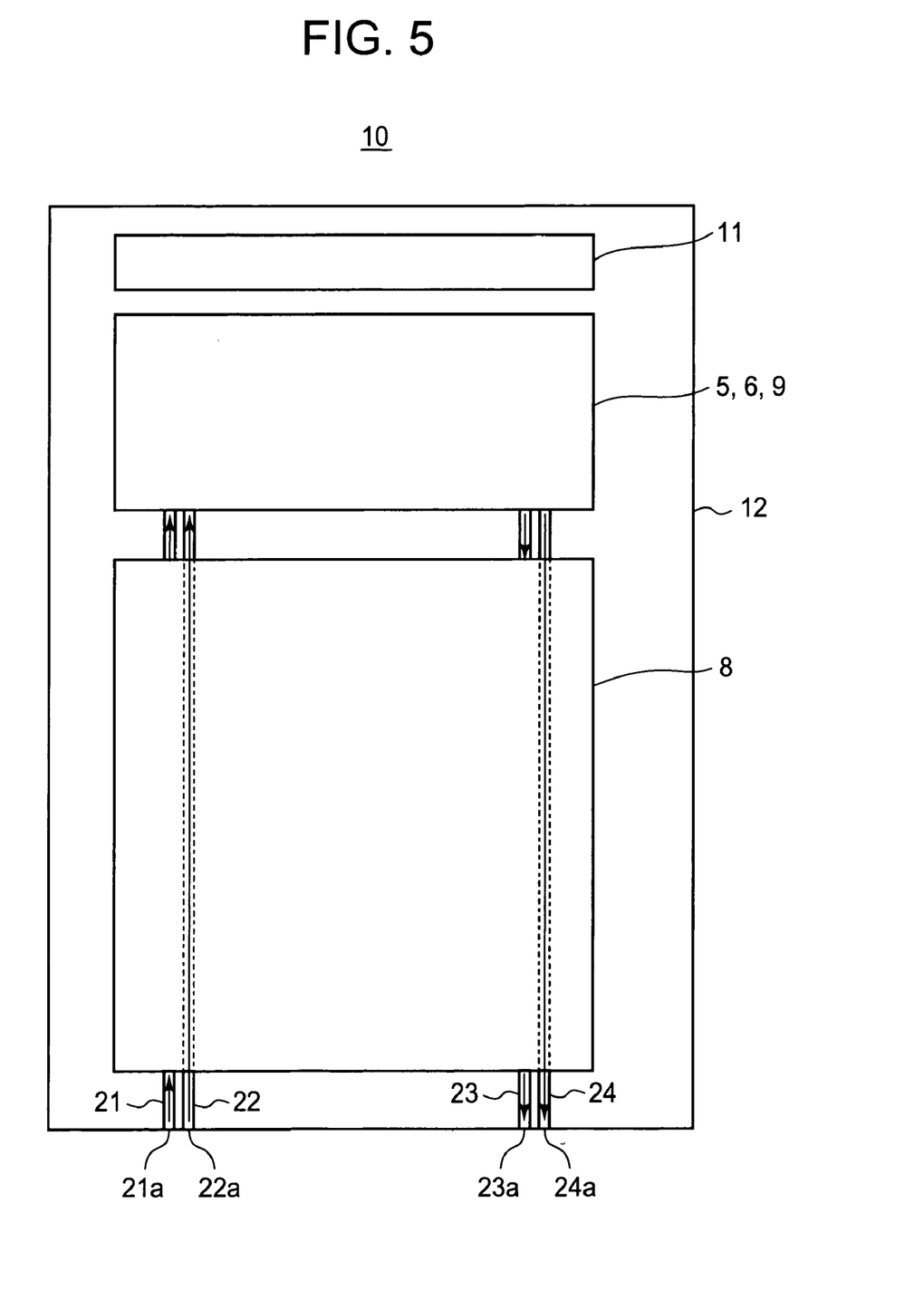
FIG. 5 is a sectional view cut along the line V-V of FIG. 4.

FIG. 5 is a sectional view cut along the line V-V of FIG. 4.

As shown in FIGS. 4 and 5, the fuel container 2 is connected with the case 12 of the fuel cell device body unit 10, and the vaporizer 4, the reformer 5, the carbon monoxide remover 6, a power generating cell 8, the catalytic combustor 9, the DC/DC converter 11, the secondary cell 7 and the like are housed in the case 12 of the fuel cell device body unit 10. The power generating cell 8 and the DC/DC converter 11 are electrically connected by a wiring 13.

Here, the reformer 5, the carbon monoxide remover 6 and the catalytic combustor 9 are integrally shown in FIGS. 4 and 5. Further, the secondary cell 7 is omitted from the diagram for convenience.

Moreover, the lower end part of the case 12 of the fuel cell device body unit 10 is provided with an outlet 23a of the discharging passage 23 which exhausts air from the power generating cell 8 and an outlet 24a of the discharging passage 24 which exhausts the waste gas from the catalytic combustor 9 along with an inlet 21a of the air supply passage 21 which supplies air to the power generating cell 8, an inlet 22a of the air supply passage 22 which supplies air to the carbon monoxide remover 6 and the catalytic combustor 9 as shown in FIG. 5.

In FIG. 4, an output electrode 25 is provided at an upper end part of the case 12 of the fuel cell device body unit 10. The output electrode 25 is electrically connected with the DC/DC converter 11 by the wiring 26.

Here, for example, it is preferable that the fuel cell device 1 is formed in a same size as the conventional secondary cell, and that the output electrode 25 is provided at the position which corresponds to the electrode of the conventional secondary cell. In such case, the fuel cell device 1 is interchangeable with the conventional secondary cell, and the electronic device 30 can use the conventional secondary cell in place of the fuel cell device 1.

As shown in FIGS. 2 and 3, a lens driving unit 35, a finder 36, a flash device 37 and the like are provided at the front surface of the case 34 of the electronic device body unit 31, and the imaging operation can be carried out.

A concave portion 40 which houses the fuel container 2 and the fuel cell device body unit 10 and a lid 50 which covers the opening part 40a of the entrance part constituted of an open end and the opening part 40a are provided at the lower surface of the case 34. On the lid 50, through holes 51 and 52 are provided at the position corresponding to the inlets 21a and 22a and the position corresponding to the outlets 23a and 24a, respectively. At the outer periphery part of the through holes 51 and 52 on the inner face of the lid 50, gaskets 53 and 54 (sealing materials) to seal the space from the fuel cell device body unit 10 to the lid 50 are provided. The air supplying passages 21 and 22 communicate with outside of the case 34 via the through hole 51 due to the gasket 53, the discharging passages 23 and 24 communicate with outside of the case 34 via the through hole 52 due to the gasket 54. Here, a filter to prevent the waste in outside air from being aspirated in the fuel cell device body unit 10 by blocking the entrance of the waste in outside air may be provided at the through hole 51 which corresponds to the inlets 21a and 22a.

At the front side middle part of the outer periphery of the opening part 40a of the entrance part of the concave portion 40, for example, a first engaging pawl 41 and a second engaging pawl 42 are provided so as to slide in a front-rear direction. The first engaging pawl 41 and the second engaging pawl 42 are biased in a rear direction by biasing members such as springs or the like (omitted from the drawing) so that the rear ends protrude into the opening part 40a of the concave portion 40. Here, the case 34 is provided with grooves 38 and 39 in which the first engaging pawl 41 and the second engaging pawl 42 are to be disposed when a user of the electronic device 30 slides the first engaging pawl 41 and the second engaging pawl 42 in the front direction against the biasing force (stress) of the biasing material.

Figure 6:
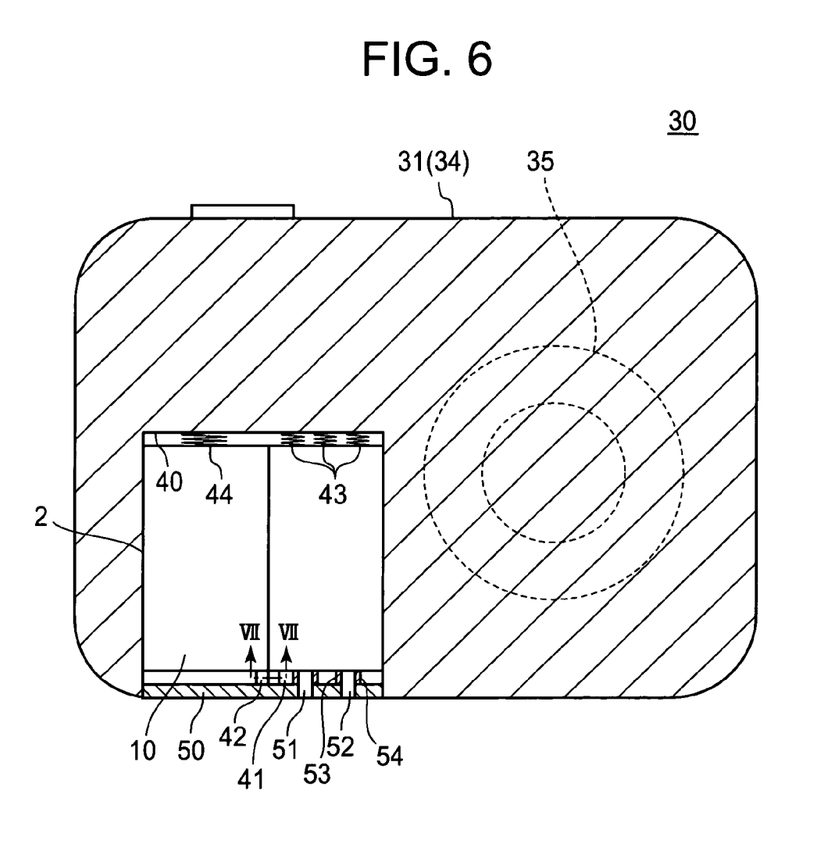
FIG. 6 is a diagram showing inside of a concave portion of the electronic device body unit of the first embodiment.

FIG. 6 is a diagram showing inside of the concave portion 40 of the electronic device body unit 31 according to the embodiment.

A terminal 43 and a biasing spring 44 are provided at the bottom of the concave portion 40.

The terminal 43 is in a coiled spring form or in a plate spring form. The terminal 43 abuts the fuel cell device body unit 10 and takes out the output electricity of the fuel cell device body unit 10 and biases (generates stress) the fuel cell device body unit 10 in a direction of removing the fuel cell device body unit 10 from the concave portion 40 (a lower direction of the drawing).

The biasing spring 44 abuts the fuel container 2 and biases (generates stress) the fuel container 2 in the direction of removing the fuel container 2 from the concave portion 40 (the lower direction of the drawing).

Here, because the output electrode 25 of the fuel cell device body unit 10 is provided on the surface which is opposite of the surface on which the inlets 21a and 22a and the outlets 23a and 24a are provided, the inlets 21a and 22a and the outlets 23a and 24a can be disposed at the lid 50 side when the fuel cell device body unit 10 is housed in the concave portion 40 so that the output electrode 25 abuts the terminal 43.

As shown in FIG. 3, the first engaging pawl 41 engages with the fuel cell device body unit 10 (contacts the side surface of the fuel cell device body unit 10 in the opening part side), and the fuel cell device body unit 10 which is biased by the terminal 43 is prevented from jumping out from the concave portion 40. The second engaging pawl 42 engages with the fuel container 2 (contacts the side surface of the fuel container 2 in the opening part side), and the fuel container 2 which is biased by the biasing spring 44 is prevented from jumping out from the concave portion 40.

On the lid 50, the through holes 51 and 52 are provided at the position corresponding to the inlets 21a and 22a and at the position corresponding to the outlets 23a and 24a, respectively. At the outer periphery part of the through holes 51 and 52 on the inner surface of the lid 50, the gaskets 53 and 54 to seal the space from the fuel cell device body unit 10 to the lid 50 are provided. The air supplying passages 21 and 22 communicate with outside of the case 34 through the through hole 51 due to the gasket 53, and the discharging passages 23 and 24 communicate with outside of the case 34 due to the gasket 54. Therefore, air, the waste gas and the like do not flow into the concave portion 40 of the case 34, and the outside air is aspirated from the inlets 21a and 22a via the through hole 51 and the air and the waste gas exhausted from the outlets 23a and 24a can be discharged outside of the case 34 via the through hole 52.

Figure 7:
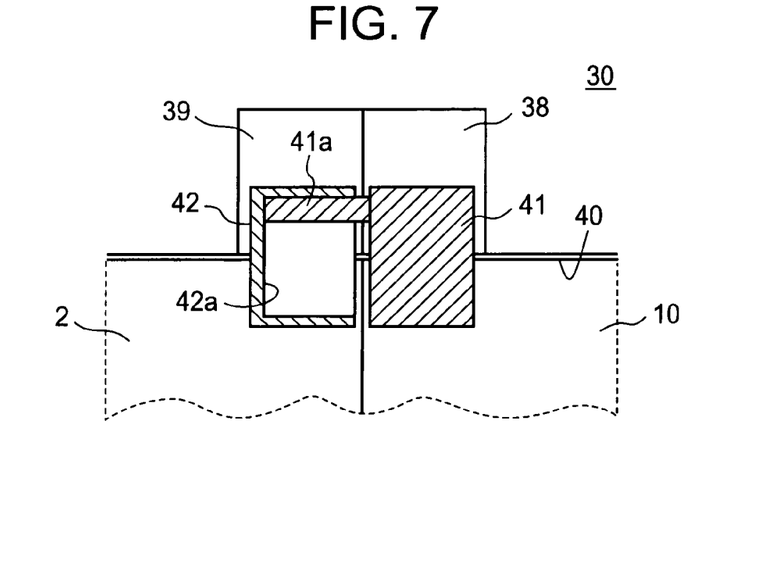
FIG. 7 is a sectional view cut along the line VII-VII of FIG. 6.

FIG. 7 is a sectional view cut along VII-VII of FIG. 6.

Figure 8:
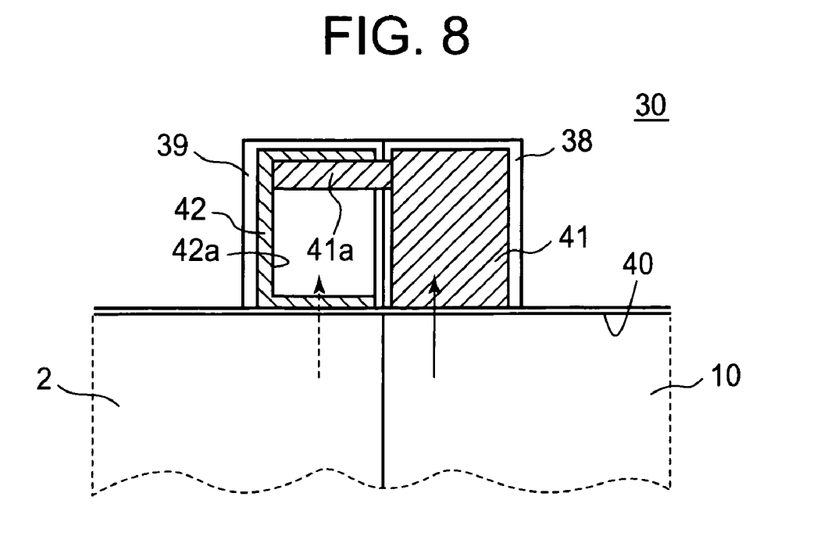
FIG. 8 is a cross sectional view showing a state where the first engaging pawl and the second engaging pawl of FIG. 7 are moved forward.

FIG. 8 shows a state in which the first engaging pawl 41 and the second engaging pawl 42 are moved forward in the sectional view similar to FIG. 7, the state corresponding to the state shown in FIG. 2.

Figure 9:
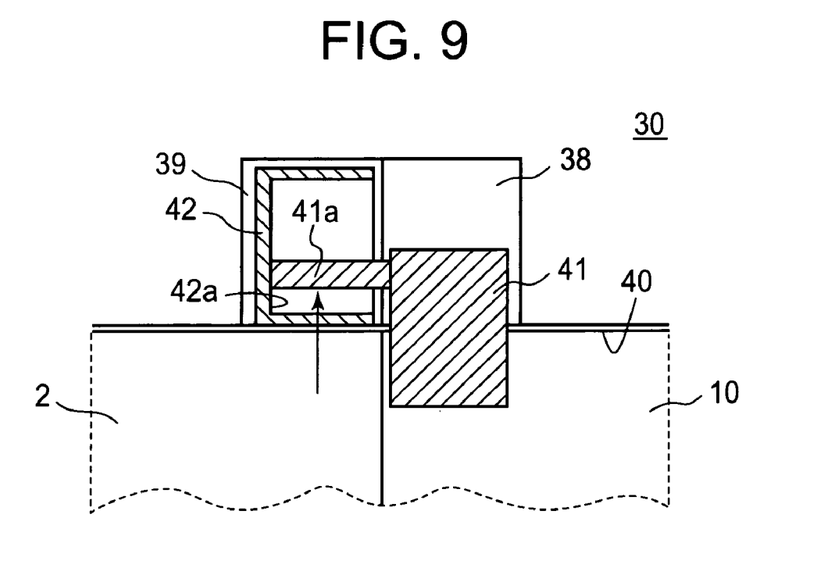
FIG. 9 is a cross sectional view showing a state where only the second engaging pawl of FIG. 7 is moved forward.

FIG. 9 is a sectional view showing a state in which only the second engaging pawl 42 is moved forward in the sectional view similar to FIG. 7.

Figure 10:
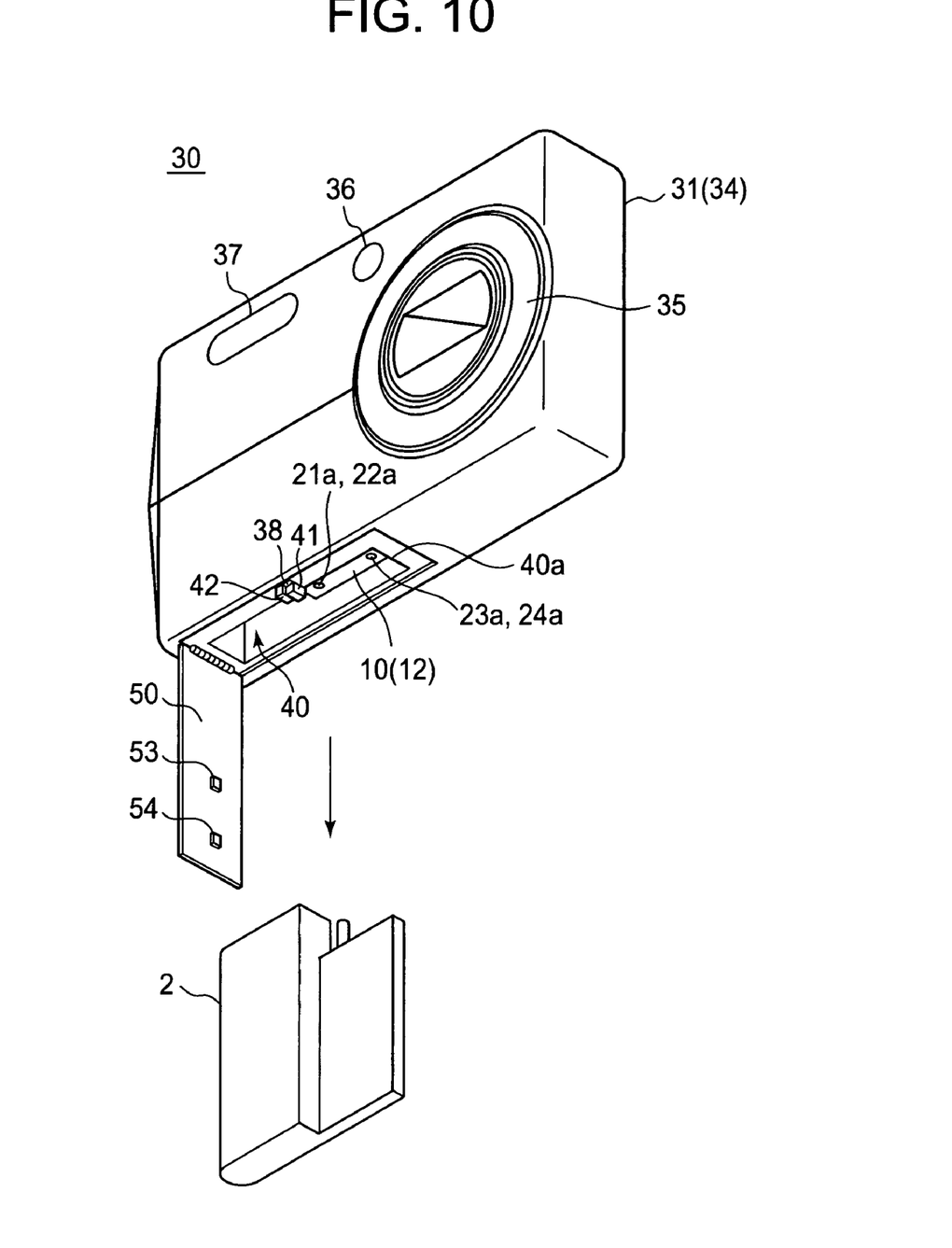
FIG. 10 is a perspective view showing a state where only the fuel container is removed from the electronic device body unit in the first embodiment.

FIG. 10 is a perspective view showing a sate in which only the fuel container 2 is removed from the electronic device body unit 31 in the embodiment.

Figure 11:
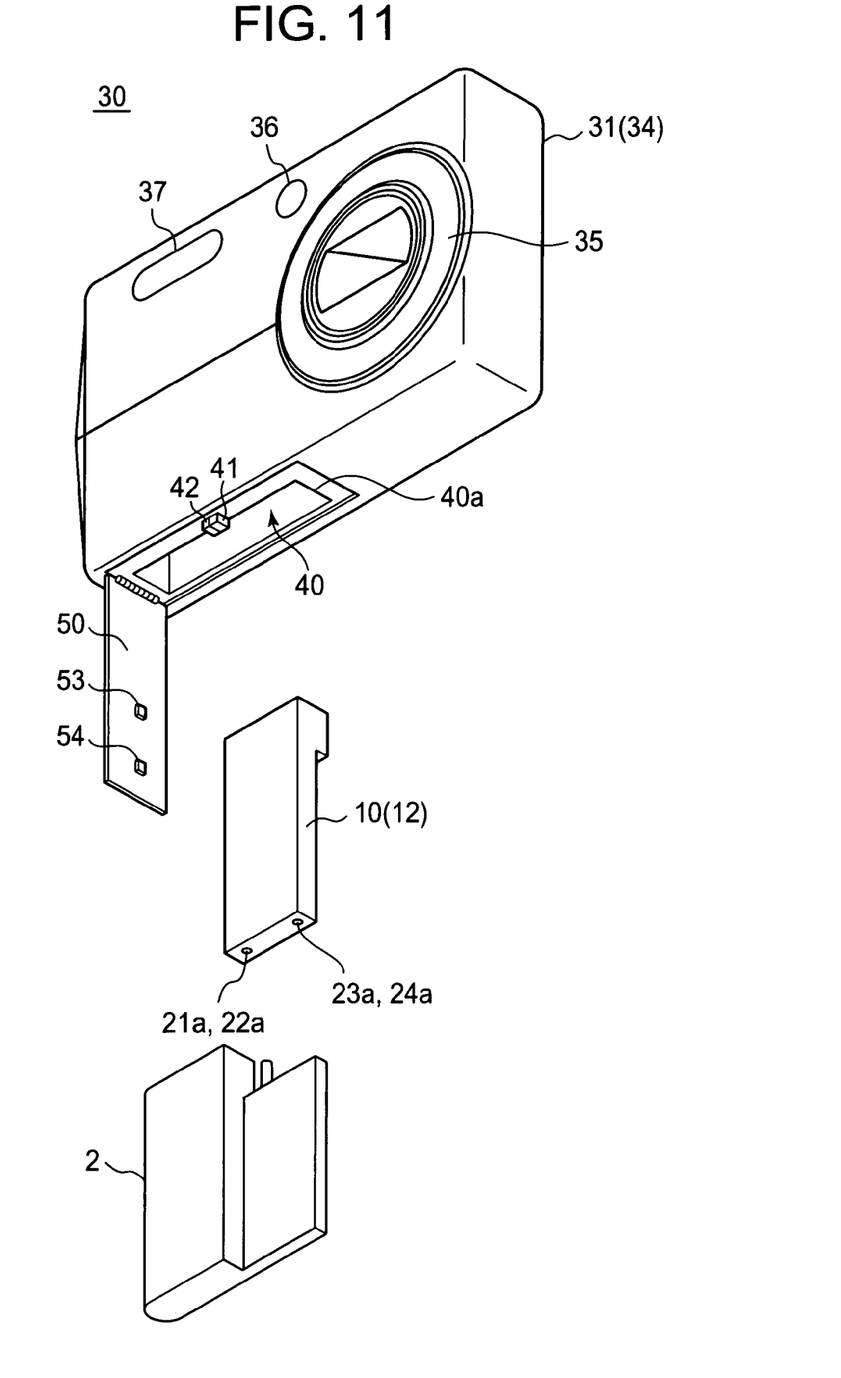
FIG. 11 is a perspective view showing a state where the fuel cell device body unit is removed from the electronic device body unit after the fuel container is removed from the electronic device body unit in the first embodiment.

FIG. 11 is a perspective view showing a state in which the fuel cell device body unit 10 is removed from the electronic device body unit 31 after the fuel container 2 is removed from the electronic device body unit 31 in the embodiment.

As shown in FIG. 7, the second engaging pawl 42 is provided with a groove 42a on the surface in the first engaging pawl 41 side thereof, and the first engaging pawl 41 is provided with an interlocking member 41a to be engagingly inserted in the groove 42a. The interlocking member 41a abuts the upper end of the inner wall of the grove 42a.

[Fuel Cell Unit Removing Method 1]

Next, a method to remove the fuel cell device 1 from the electronic device body unit 31 at once will be described.

When the first engaging pawl 41 is moved in the opposite direction (forward direction) of the biasing direction of the spring (omitted from the drawing) and is moved to the outer periphery part of the opening part 40a of the concave portion 40 from the state where the fuel container 2 and the fuel cell device body unit 10 are housed in the electronic device body unit 31, the engagement between the fuel cell device body unit 10 and the first engaging pawl 41 is released as shown in FIG. 8. Here, the second engaging pawl 42 moves to the outer periphery part of the opening part 40a of the concave portion 40 along with the first engaging pawl 41 because the interlocking member 41a abuts the upper end of the inner wall of the groove 42a. Therefore, the engagement between the first engaging pawl 41 and the fuel cell device body unit 10 is also released, and the fuel cell device body unit 10 can be removed from the electronic device body unit 31 along with the fuel container 2 as shown in FIG. 2.

[Fuel Cell Unit Removing Method 2]

Next, the method of removing the fuel container 2 and the fuel cell device body unit 10 separately from the electronic device body unit 31 will be described.

First, when the second engaging pawl 42 is moved in the opposite direction (forward direction) of the biasing direction of the spring (omitted from the drawing) and is moved to the outer periphery part of the opening part 40a of the concave portion 40, the engagement between the fuel container 2 and the second engagement pawl 42 is released as shown in FIG. 9, and only the fuel container 2 can be removed from the electronic device body unit 31 as shown in FIG. 10.

Here, the first engaging pawl 41 does not move because it is biased so as to protrude toward the opening part of the concave portion 40 by a spring (omitted from the drawing), and the groove 42a moves in the forward direction (upper direction in FIG. 9) with respect to the interlocking member 41a. Therefore, the first engaging pawl 41 and the fuel cell device body unit 10 remain being engaged.

Next, when the first engaging pawl 41 is moved in the opposite direction (forward direction) of the biasing direction of a spring (omitted from the drawing) and is moved toward further outside than the opening part of the concave portion 40, the engagement between the fuel cell device body unit 10 and the first engaging pawl 41 is released as shown in FIG. 8, and the fuel cell device body unit 10 can be removed from the electronic device body unit 31 as shown in FIG. 11.

In such way, according to the embodiment, the engagement can be released by only moving the second engaging pawl 42, and the engagement of the second engaging pawl 42 can be released in conjunction with the releasing of the engagement of the first engaging pawl 41. Therefore, only the fuel container 2 is detachable from the electronic device body unit 31, and the entire fuel cell device 1 including the fuel container 2 and the fuel cell device body unit 10 can be detachable from the electronic device body unit 31.

Second Embodiment

Figure 12:
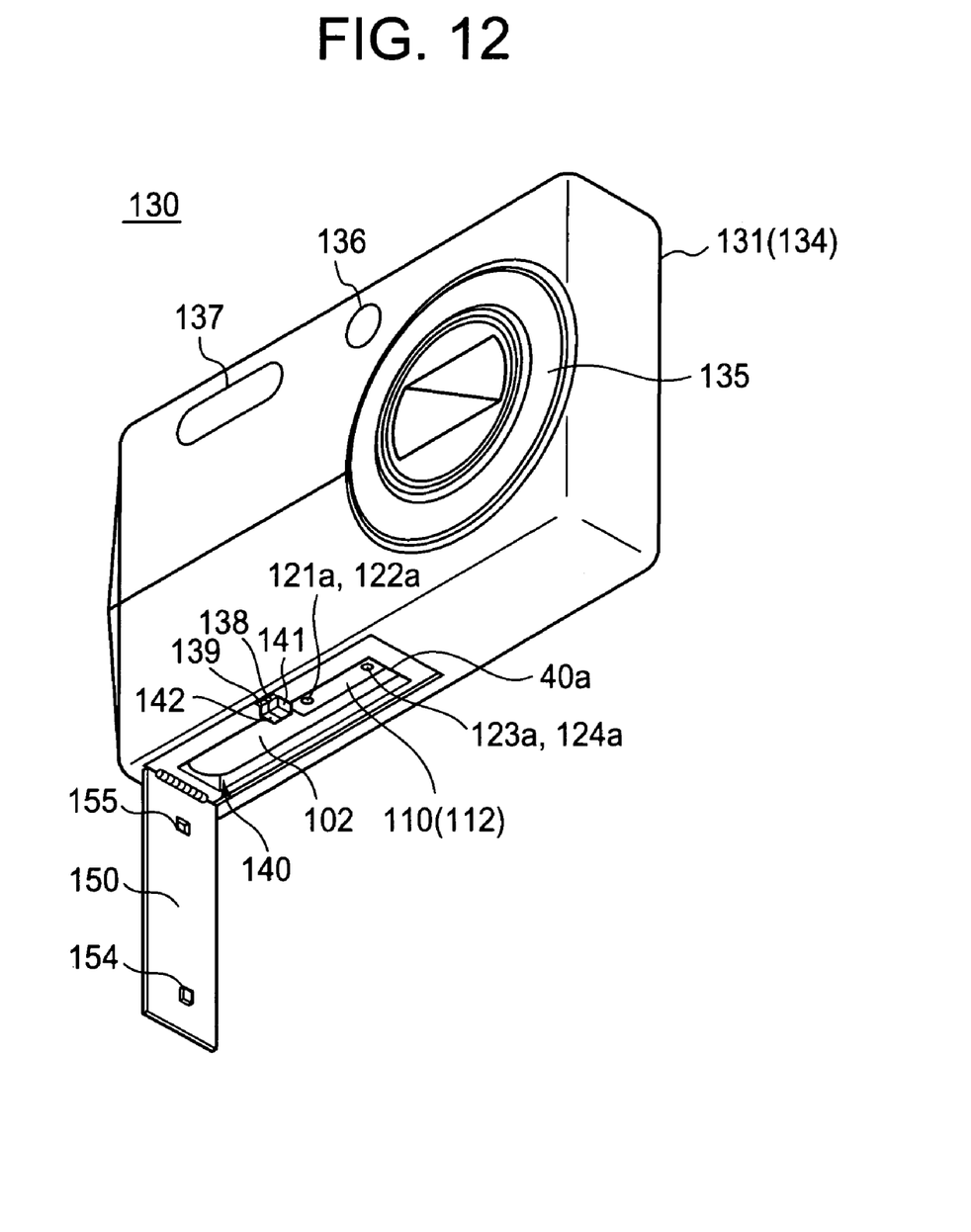
FIG. 12 is a perspective view showing an electronic device according to the second embodiment of the present invention.

FIG. 12 is the perspective view showing an electronic device 130 according to the second embodiment of the present invention.

Figure 13:
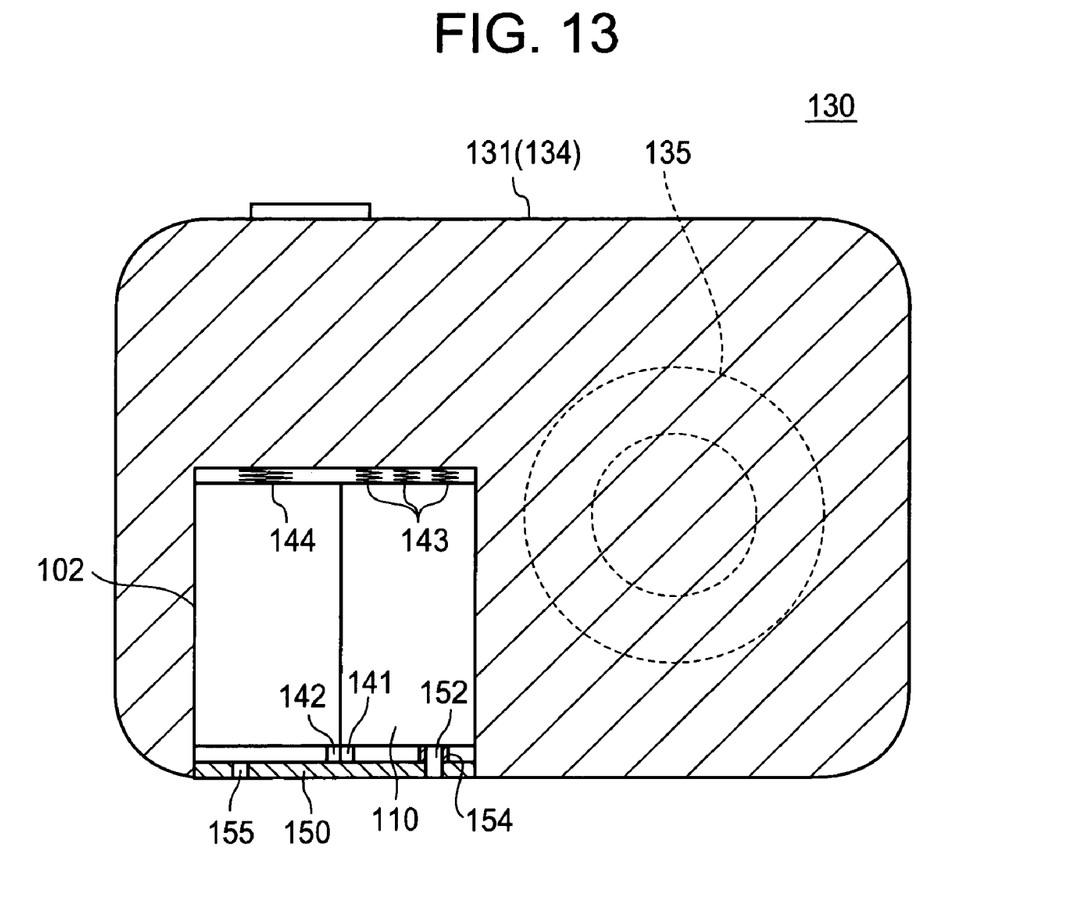
FIG. 13 is a diagram showing inside of a concave portion of the electronic device of the second embodiment.

FIG. 13 is a diagram showing inside of the concave portion 140 which is provided at an electronic device body unit 131 of the electronic device 130 of the embodiment.

Here, reference numerals with the same last two digits are used for the structures similar to the first embodiment and the descriptions are omitted.

In the embodiment, the through holes and the gaskets do not exist at the position corresponding to the inlets 121a and 122a on the lid 150. Instead, a through hole 155 is provided at the position apart from the inlets 121a and 122a and the outlets 123a and 124a on the lid 150. Therefore, the air flows between the fuel container 102 and the lid 150 and between the fuel cell device body unit 110 and the lid 150 from the through hole 155, and is aspirated in the fuel cell device body unit 110 from the inlets 121a and 122a. Further, a filter to block the waste in the outside air so that the waste in the outside air is not aspirated in the fuel cell device body unit 10 may be provided at the through hole 155.

In such way, air can be heated by the heat of the fuel container 102 and the fuel cell device body unit 110 by taking the air into the fuel cell device body unit 110 through between the fuel container 102 and the lid 150 and between the fuel cell device body unit 110 and the lid 150 and not directly taking in the air from outside the electronic device body unit 131. The temperature can be raised effectively by efficiently using the heat of the fuel cell device body unit 110, and a beneficial effect which cannot be obtained from the above described first embodiment can be obtained.

Moreover, the through hole 152 which is provided at the position corresponding to the outlets 123a and 124a and the through hole 155 are disposed apart from one another because the through hole 155 is provided at the position apart from the outlets 123a and 124a. Therefore, the waste gas which is discharged outside of the electronic device body unit 131 from the through hole 152 can be prevented from being aspirated again from the through hole 155. In such way, an error operation or a breakdown of the electronic device body unit 131 can be prevented and the electronic device body unit 131 can operate steadily, and a beneficial effect which cannot be obtained from the above described first embodiment can be obtained.

<Modification>

Figure 14:
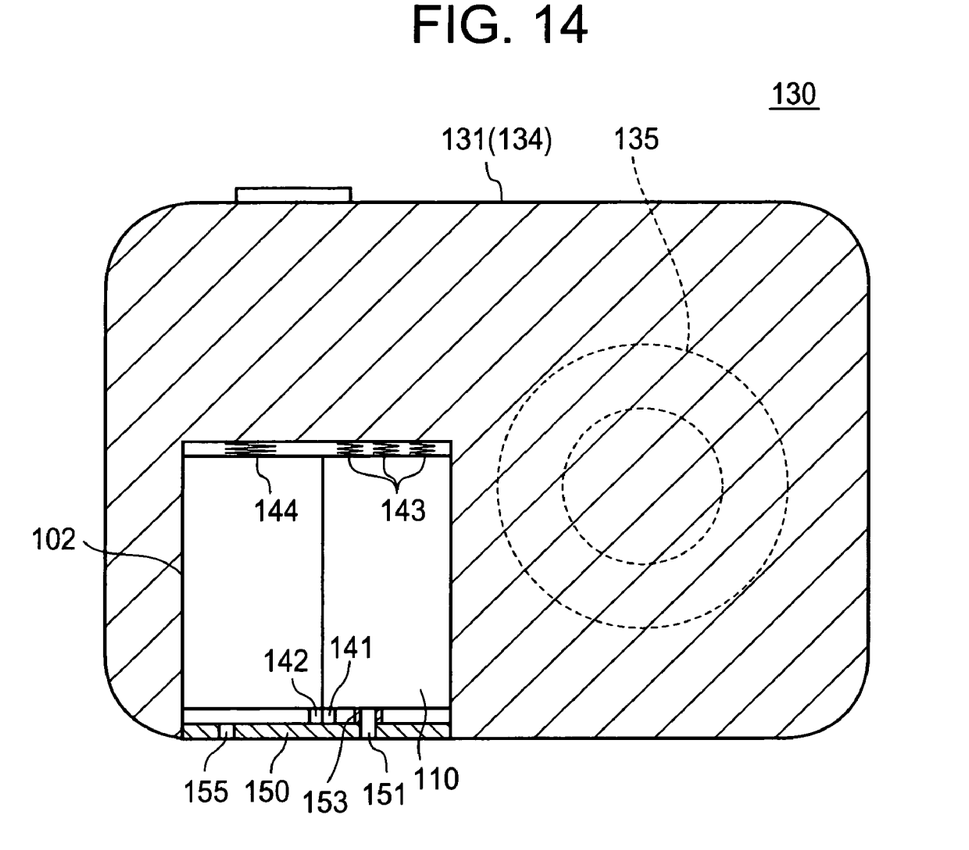
FIG. 14 is a diagram showing the electronic device according to the modification of the second embodiment.

FIG. 14 is a diagram showing the electronic device 130 according to the modification of the present invention.

That is, as shown in FIG. 14, the through hole 151 and the gasket 153 may be provided at the position corresponding to the inlets 121a and 122a on the lid 150, and the through hole 152 and the gasket 154 at the position corresponding to the outlets 123a and 124a can be canceled and instead the through hole 155 may be provided at the position apart from the inlets 121a and 122a and the outlets 123a and 124a on the lid 150. Further, a filter to block the waste in the outside air so that the waste in the outside air is not aspirated in the fuel cell device body unit 10 may be provided at the through hole 151.

In this case, the air exhausted from the power generating cell 8 and the waste gas exhausted from the catalytic combustor 9 flow between the fuel contain 102 and the fuel cell device body unit 110 and the lid 150 from the outlets 23a and 24a, and are discharged outside of the electronic device body unit 131 from the through hole 155.

In such way, the fuel container 102 and the fuel cell device body unit 110 can be heated by the air and the waste gas to be exhausted and the air and the waste gas to be exhausted can be cooled by discharging the air and the waste gas outside the electronic device body unit 131 after allowing them to flow between the fuel container 102 and the lid 150 and between the fuel cell device body unit 110 and the lid 150 and not directly discharging the air and the waste gas outside of the electronic device body unit 131. Therefore, the air and the waste gas at high temperature can be prevented from being directly exhausted outside of the electronic device body 131. In such way, the heat efficiency can be improved by effectively using the heat of the waste gas, and a beneficial effect which cannot be obtained from the above described first embodiment can be obtained.

Moreover, the through hole 151 which is provided at the position corresponding to the inlets 121a and 122a and the through hole 155 are disposed apart from one another because the through hole 155 is provided at the position apart from the inlets 121a and 122a. Therefore, the waste gas which is discharged outside of the electronic device body unit 131 from the through hole 155 can be prevented from being aspirated again from the through hole 151. In such way, an error operation or a breakdown of the electronic device body unit 131 can be prevented and the electronic device body unit 131 can operate steadily, and a beneficial effect which cannot be obtained from the above described first embodiment can be obtained.

Third Embodiment

Figure 15:
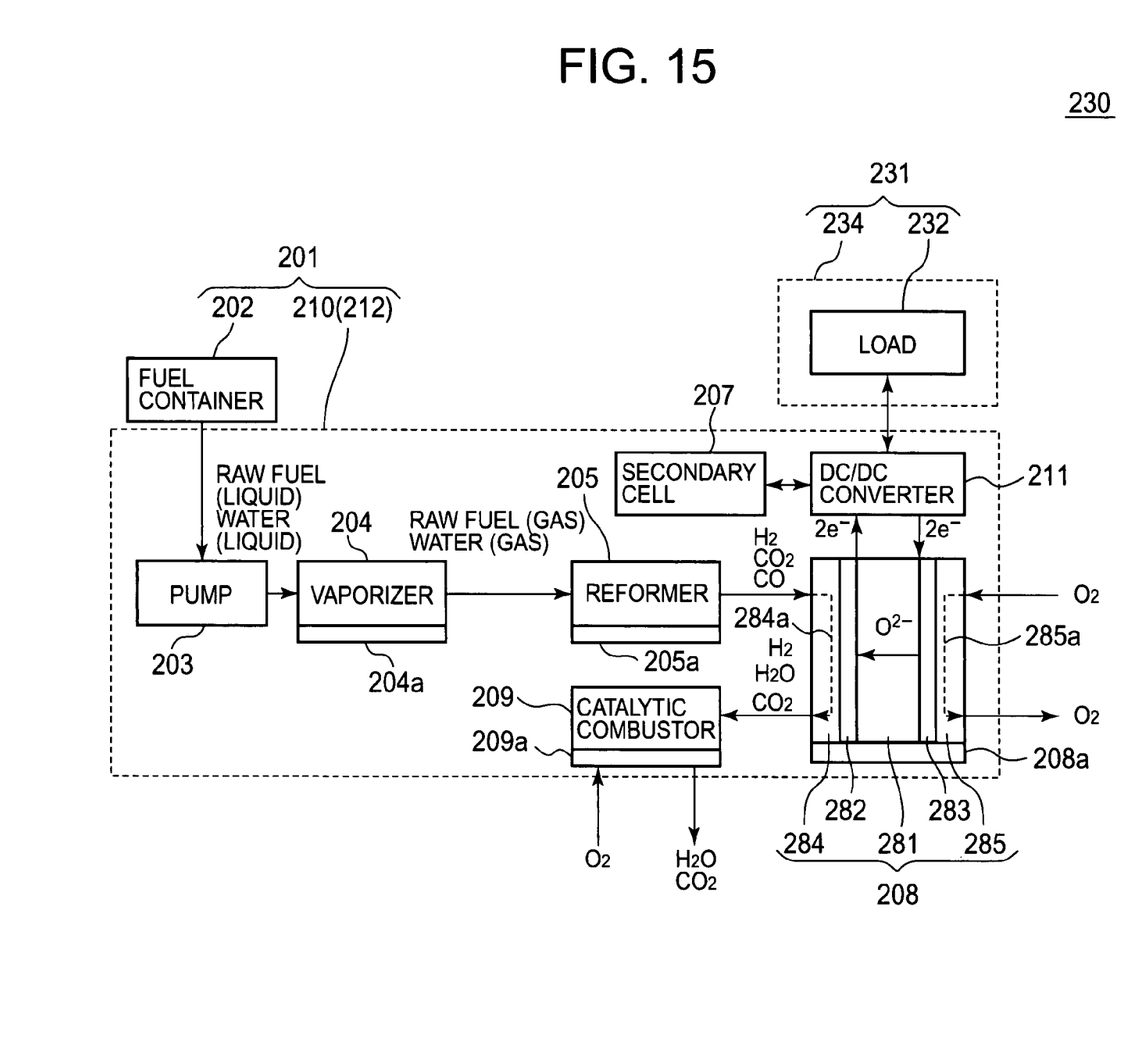
FIG. 15 is a block diagram showing a structure of an entire electronic device according to the third embodiment of the present invention.

FIG. 15 is a block diagram showing a structure of an entire electronic device 230 according to the third embodiment of the present invention. Here, reference numerals with the same last two digits are used for the structures similar to the first embodiment and the descriptions are omitted.

In the electronic device 230 of the embodiment, a solid oxide electrolyte 281 is used for the power generating cell 208. Further, in the fuel cell which uses the solid oxide electrolyte 281, the carbon monoxide remover is omitted because a carbon monoxide can also be used as a fuel as described below.

The solid oxide electrolyte 281 has oxygen ion permeability, and the oxygen ion generated in the oxygen electrode 283 passes through the solid oxide electrolyte 281 and reaches the fuel electrode 282. For the solid oxide electrolyte 281, a zirconia $(Zr_{1-x}Y_x)O_{2-x/2}$(YSZ), a lanthanum gallate $(La_{1-x}Sr_x)(Ga_{1-y-z}Mg_yCo_z)_3$ or the like can be used.

For the oxygen electrode 283, Ni, Ni+YSZ or the like can be used. Further, for the fuel electrode 282, $La_{0.84}Sr_{0.16}MnO_3$, La(Ni, Bi)$O_3$, (La, Sr)MnO$_3$, $In_2O_3$+SnO$_2$, LaCoO$_3$ or the like can be used.

For the fuel electrode separator 284 and the oxygen electrode separator 285, LaCr(Mg) O$_3$, (La, Sr)CrO$_3$, NiAl+Al$_2$O$_3$ or the like can be used.

Air is sent to the oxygen electrode 283 via the oxygen supplying passage 285a. In the oxygen electrode 283, the oxygen ion is generated as in formula (6) shown below by the oxygen in the air and the electron supplied from the cathodic output electrode (omitted from the drawing).

$$O_2 + 4e^- \rightarrow 2O^{2-} \quad (6)$$

The oxygen ion generated in the oxygen electrode 283 passes through the solid oxide electrolyte 281 and reaches the fuel electrode 282.

The reformed gas which is sent out from the reformer 206 is sent to the fuel electrode 282 via the fuel supplying passage 284a. The oxygen ion which passes through the solid oxide electrolyte 281 and the reformed gas carries out reactions shown in formulas (7) and (8) in the oxygen electrode 283.

$$H_2 + O^{2-} \rightarrow H_2O + 2e^- \quad (7)$$

$$CO + O^{2-} \rightarrow CO_2 + 2e^- \quad (8)$$

In such way, even CO can be used as fuel in the solid oxide fuel cell because the operation temperature is high, the temperature being 600 to 800° C. Therefore, the power generating efficiency can be improved.

The structure similar to the electronic device according to the first embodiment can be also used in the embodiment. Only the fuel container 202 can be detachable from the electronic device body unit 231 and the entire fuel cell device body unit 201 including the fuel container 202 and the fuel cell device body unit 210 can be detachable from the electronic device body unit 231.

A digital camera is described in the above embodiment. However, the present invention is not limited to this, and the present invention may be applied to arbitrary electronic devices which use the fuel cell unit.

What is claimed is:

1. An electronic device, comprising:
a fuel container to contain fuel inside thereof;
a fuel cell device body unit to generate electricity by using the fuel which is in the fuel container; and
an electronic device body unit to which the electricity is supplied from the fuel cell device body unit, wherein:
a case of the electronic device body unit is provided with a concave portion in which the fuel cell device body unit and the fuel container are housed,
the fuel cell device body unit is detachably provided to the electronic device body unit,
the fuel container is detachably provided to the fuel cell device body unit by sliding in a housing direction toward the concave portion, and
the case of the electronic device body unit is provided with a first engaging pawl which engages with the fuel cell device body unit and a second engaging pawl which engages with the fuel container near an entrance part of the concave portion.

2. The electronic device as claimed in claim 1, wherein the first engaging pawl comprises an interlocking member to release an engagement of the second engaging pawl with the fuel container in conjunction with a release of an engagement of the fuel cell device body unit with the first engaging pawl.

3. The electronic device as claimed in claim 1, wherein:
the case of the electronic device body unit is provided with a lid which covers the concave portion,
the fuel cell device body unit is provided with an inlet to take in air and an outlet to exhaust waste gas at a position that is adjacent to the lid in a state in which the fuel cell device body unit is housed in the concave portion, and
the lid is provided with through holes through which the air and the waste gas pass.

4. The electronic device as claimed in claim 3, wherein a plurality of the through holes are provided at the lid, and the plurality of through holes are provided at positions facing the inlet and the outlet of the fuel cell device body unit, respectively.

5. The electronic device as claimed in claim 3, wherein a plurality of the through holes are provided at the lid, and at least one through hole of the plurality of through holes is provided at a position which faces neither the inlet nor the outlet of the fuel cell device body unit.

6. The electronic device as claimed in claim 4, wherein a sealing member to seal a gap portion is provided between the through hole provided so as to face the inlet or the outlet and the inlet or the outlet corresponding to the through hole.

7. The electronic device as claimed in claim 4, wherein sealing members to seal gap portions are provided between the through holes provided so as to face the inlet and the outlet, and the inlet and the outlet corresponding to the through holes.

8. The electronic device as claimed in claim 3, wherein an output electrode is provided on a surface of the case of the fuel cell device body unit which is opposite from a surface on which the inlet and the outlet are provided.

9. The electronic device as claimed in claim 1, wherein the electronic device body unit is a digital camera.

* * * * *